United States Patent [19]

Kerr et al.

[11] Patent Number: 5,681,479

[45] Date of Patent: Oct. 28, 1997

[54] PHOSPHONIC COTELOMERS AND METHOD OF USE

[75] Inventors: Elizabeth A. Kerr, Knutsford; Jan Rideout, Bolton, both of England

[73] Assignee: FMC Corporation (UK) Limited, Philadelphia, Pa.

[21] Appl. No.: 483,431

[22] Filed: Jun. 7, 1995

Related U.S. Application Data

[60] Continuation-in-part of Ser. No. 308,038, Sep. 16, 1994, Pat. No. 5,604,291, which is a division of Ser. No. 887,622, May 22, 1992, Pat. No. 5,376,731.

[30] Foreign Application Priority Data

May 31, 1991 [GB] United Kingdom .................. 9111704

[51] Int. Cl.$^6$ ...................................................... C02F 5/14
[52] U.S. Cl. ........................... 210/699; 210/700; 210/701; 252/180; 526/240; 526/287; 525/328.2
[58] Field of Search ........................ 525/328.2; 526/240, 526/287; 210/699, 700, 701; 252/180

[56] References Cited

U.S. PATENT DOCUMENTS

| | | | |
|---|---|---|---|
| 2,957,931 | 10/1960 | Hamilton et al. | 260/403 |
| 3,539,654 | 11/1970 | Pautrat et al. | 260/768 |
| 4,029,577 | 6/1977 | Snyder et al. | 210/701 |
| 4,046,707 | 9/1977 | Smith et al. | 252/180 |
| 4,374,733 | 2/1983 | Godlewski . | |
| 4,650,591 | 3/1987 | Boothe et al. | 210/700 |
| 4,681,686 | 7/1987 | Richardson et al. | 210/699 |
| 5,073,299 | 12/1991 | Cook | 252/389.23 |
| 5,160,630 | 11/1992 | Clubley et al. | 210/699 |
| 5,229,030 | 7/1993 | Clubley et al. | 252/389.23 |
| 5,512,183 | 4/1996 | Boyette et al. | 210/697 |

FOREIGN PATENT DOCUMENTS

| | | |
|---|---|---|
| 0150706 | 8/1985 | European Pat. Off. . |
| 0175317 | 3/1986 | European Pat. Off. . |
| 0352949 | 1/1990 | European Pat. Off. . |
| 0360746 | 3/1990 | European Pat. Off. . |
| 0360747 | 3/1990 | European Pat. Off. . |
| 0405818 | 1/1991 | European Pat. Off. . |
| 10727796 | 6/1967 | United Kingdom . |
| 1178308 | 1/1970 | United Kingdom . |

OTHER PUBLICATIONS

British Search Report Oct. 2, 1991.
Russian Technical Journal Izv. Akad. Nauk. USSR 1989, 1390.
Partial translation of above Russian article.

*Primary Examiner*—Mark Nagumo
*Attorney, Agent, or Firm*—Patrick C. Baker; Robert L. Andersen

[57] ABSTRACT

Phosphonic coletomers of the formula I:

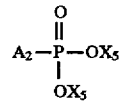

wherein $X_5$ is hydrogen, an alkali metal atom, an alkaline earth metal atom, or an ammonium or amine residue; and $A_2$ is a copolymer residue comprising two different residues

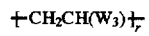

wherein r is an integer ranging from 2 to 100, and wherein, in the first residue, $W_3$ is —COOH, and in the second residue, $W_3$ is —CONHC(CH$_3$)$_2$CH$_2$SO$_3$X$_5$ wherein X$_5$ is as hereinbefore defined. The cotelomers inhibit scale and corrosion in aqueous systems.

10 Claims, No Drawings

PHOSPHONIC COTELOMERS AND METHOD OF USE

This application is a continuation-in-part of U.S. application Ser. No. 08/308,038 filed Sep. 16, 1994, now allowed U.S. Pat. No. 5,604,291. The latter is a division of application Ser. No. 07/887,622 filed May 22, 1992, now U.S. Pat. No. 5,376,731 issued Dec. 27, 1994.

This invention relates to phosphonic cotelomers having scale inhibiting properties and their use for inhibiting scale formation and/or metal corrosion in aqueous systems.

The majority of natural waters, and aqueous systems in general, contain dissolved salts of metals such as calcium, magnesium, barium and strontium. When the water or aqueous system is subjected to heating, the dissolved salts may be converted to insoluble salts and deposited as scale on heat transfer surfaces in contact with the water or aqueous system. If the water or aqueous system is concentrated, even without heating, insoluble salts may also be precipitated.

Salt precipitation and scale deposition are troublesome and can cause increased costs in maintaining aqueous systems in good working order.

There is a need in this field for a composition which can be added to water or aqueous systems in very small quantities and which can cut down the rate at which insoluble salts are precipitated over a wide temperature range, and can also disperse those insoluble salts which are precipitated. Furthermore, when any scale is formed, it should desirably be easily removable from surfaces by simple mechanical means.

The phosphonic telomers of this invention are represented by the formula I:

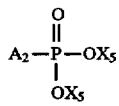

I in which $X_5$ is hydrogen or a water solubilizing cation selected from an alkali metal atom, an alkaline earth metal atom and an ammonium or amine residue and $A_2$ is a copolymer residue comprising two different residues encompassed by the formula (II):

II wherein, in the first residue, $W_3$ is —COOH, and in the second residue, $W_3$ is —CONHC(CH$_3$)$_2$CH$_2$SO$_3$X$_5$ where $X_5$ has its previous significance. In formula II, r is an integer ranging from 2 to 100 preferably 4 to 50, especially 4 to 20, and comprises the sum of m mols of the first residue and n mols of the second residue. The ratio of m to n ranges from 99:1 to 1:99 provided the resulting copolymer is water soluble.

The cotelomers are prepared by reacting, in an aqueous medium, a compound of the formula III:

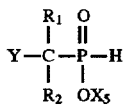

III in which $X_5$ has its previous significance, Y is —OR$_3$ in which R3 is hydrogen or $C_1$-$C_4$ alkyl or —NR$_4$R$_5$ in which R$_4$ and R$_5$, independently, are hydrogen or $C_1$-$C_4$ alkyl, or R$_4$ and R$_5$, together with the nitrogen atom to which they are bonded can form an N-heterocyclic ring e.g. a pyridine, piperidine or morpholine ring; and R$_1$ and R$_2$, together with the carbon atom to which they are bonded, may form a cyclopentyl or cyclohexyl ring, with r moles of two different olefins encompassed by formula IV:

IV in which $W_3$ has the previous significance, to form a compound of formula V:

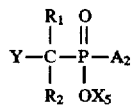

V in which Y, $R_1$, $R_2$, $X_5$, and $A_2$ have their previous significance; and then converting the compound of formula V to a compound of formula I, e.g. by reaction with hypochlorite.

Alkali metal atoms $X_5$ are, particularly, alkali metals such as sodium or potassium ions, and alkaline earth metal atoms $X_5$ are especially, calcium, barium or strontium ions. Amine residues $X_5$ are e.g. —NH(CH$_3$)$_3$, —NH(C$_2$H$_5$)$_3$ or —NH(CH$_2$CH$_2$OH)$_3$.

The reaction of the compound of formula II I with the olefins of formula IV may be performed in the presence of a reaction initiator, generally described in U.S. Pat. No. 2,957,931. Suitable reaction initiators include materials which decompose, under the reaction conditions, to yield free radicals. Examples of such materials are bisazoisobutyronitrile; organic peroxide and monobutyl hydroperoxide; and oxidizing agents such as hydrogen peroxide, sodium perborate and sodium persulphate.

The olefin reactants of formula IV are acrylic acid and 2-acrylamido-2-methylpropanesulphonic acid. The latter monomer is available from the Lubrizol Corporation under the brand name "AMPS".

The compounds of formula III may be produced by reacting hypophosphorous acid having the formula VI:

VI with a compound having the formula VII:

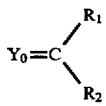

VII in which $Y_o$ is O or NR$_4$, and R$_1$ and R$_2$ have their previous significance.

The reaction may be conveniently performed by firstly, adding mineral acid, e.g. hydrochloric acid, to a salt or ester of hypophosphorous acid, e.g. sodium hypophosphite, to generate hypophosphorous acid in situ. The compound of formula VII may then be added. The reaction is preferably conducted at elevated temperature, conveniently at the reflux temperature of the reaction mixture. The product of formula III may be isolated, as free acid, salt or ester, by conventional method.

When Y in the compounds of formula III is —NR$_4$R$_5$, such compounds may be produced by reacting hypophosphorous acid with a compound of formula O=C R$_1$R$_2$ (VIIA), in which R$_1$ and R$_2$ have their previous significance, in the presence of an amine R$_4$R$_5$NH where R$_4$ and R$_5$ are as previously defined.

Examples of carbonyl reactants of formula VII or VIIA include formaldehyde, acetaldehyde, propionaldehyde, butyraldehyde, acetone, methylethylketone, diethylketone, dipropylketone, dibutylketone, cyclopentanone and cyclohexanone; and examples of imine reactants VII are methylethylketimine and cyclohexylketimine.

The products of formula I, produced by the process of the present invention, are obtained as aqueous solutions.

These solutions may be subjected to partial or complete evaporation under reduced pressure. The unpurified reaction products may be used directly as scale-inhibiting cotelomeric products. The reaction products may be purified if desired. Examples of suitable purification procedures are:

i) by evaporation of the aqueous reaction solvent, dissolving the residue in water, washing with a water immiscible organic solvent, e.g. ether, and evaporation of the aqueous solution, ii) by evaporation of the aqueous reaction solvent, dissolving the residue in a suitable solvent, e.g. methanol, and reprecipitation by addition of a non-solvent, e.g. ether.

If desired, any acid groups so obtained may be converted, by conventional methods, into the corresponding salt groups.

Salts of the compounds of formula I in which some or all of the acidic hydrogens in the compounds of formula I have been replaced by the cations derived from the salt forming bases hereinbefore defined, may be prepared by mixing an aqueous or alcoholic solution of the compound of formula I with an aqueous or alcoholic solution containing an amount of the requisite base in excess of, equal to or less than the stoichiometric requirement. The solvent may then be removed by evaporation. In many of the water-containing systems where inhibitors of this invention would prove useful, the water is sufficiently alkaline to effect neutralization and only the acidic (X5=H) product of the invention need be added.

The present invention also provides a method of treating an aqueous system, to inhibit scale formation or fouling therein and/or to inhibit corrosion of metal surfaces in contact with the aqueous system, comprising adding to the system a cotelomer compound of formula I.

In practice, the amount of the compound of formula I used to treat the aqueous system may vary according to the protective function which the compound is required to perform.

For example, for corrosion-inhibiting protective treatments, optionally with simultaneous scale-inhibiting treatments, the amount of the compound of formula I added to the aqueous system may range from 0.1 to 50,000 ppm (0.00001 to 5% by weight), preferably from 1 to 500 ppm (0.0001 to 0.05% by weight), based on the weight of the aqueous system.

For solely anti-scale treatments, the amount of the compound of formula I added is conveniently from 1 to 200, preferably 1 to 30 ppm, based on the aqueous system.

For most relatively dilute aqueous dispersions to be treated, the amount of compound of formula I to be added as dispersant/antifoulant is conveniently from 1 to 200 ppm, preferably 2–20 ppm by weight. Aqueous slurries to be treated, however, may require much higher levels of a compound of formula I, e.g. from 0.1 to 5% by weight on total solids—which can be as high as 70% by weight of the total aqueous system.

When used to inhibit deposition of scale and the precipitation of salts from aqueous solutions, the compounds of formula I, are particularly effective in inhibiting deposition of scale-forming salts derived from calcium, magnesium, barium or strontium cations, and anions such as sulphate, carbonate, hydroxide, phosphate and silicate.

With respect to aqueous systems which may be treated according to the present invention, of particular interest with respect to combined corrosion inhibition and anti-scale treatments are cooling water systems, steam generating systems, sea-water evaporators, reverse osmosis equipment, paper manufacturing equipment, sugar evaporator equipment, soil irrigation systems, hydrostatic cookers, gas scrubbing systems, closed circuit heating systems, aqueous-based refrigeration systems and down-well systems; for corrosion inhibition treatments alone, aqueous systems of particular interest include aqueous machining fluid formulations (e.g. for use in boring, milling, reaming, broaching, drawings, spinning, turning, cutting, sawing, grinding, and thread-cutting operations or in non-cutting shaping in drawing or rolling operations), aqueous scouring systems, engine coolants including aqueous glycol antifreeze systems, water/glycol hydraulic fluids; and aqueous based polymer surface-coating systems/or solvent-based polymer systems, e.g. those containing tetrahydrofuran, ketones or alkoxyalkanols.

The inhibitor compound of formula I used according to the invention may be used alone, or in conjunction with other compounds known to be useful in the treatment of aqueous systems.

In the treatment of systems which are completely aqueous, such as cooling water systems, air-conditioning systems, steam-generating systems, sea-water evaporator systems, hydrostatic cookers, and closed circuit heating or refrigerant systems, further corrosion inhibitors may be used such as, for example, water soluble zinc salts; phosphates; polyphosphates; phosphonic acids and their salts, for example, hydroxyethyl diphosphonic acid (HEDP), nitrilo tris methylene phosphonic acid and methylamino dimethylene phosphonocarboxylic acids and their salts, for example, those described in German Offenlegungsschrift 2632774, hydroxyphosphonoacetic acid, 2-phosphonobutane-1,2,4-tri-carboxylic acid (PBSAM) and those disclosed in GB 157406; nitrates, for example, sodium nitrate; nitrites, e.g. sodium nitrite; molybdates, e.g. sodium molybdate, tungstates, e.g. sodium tungstate; silicates, e.g. sodium silicate; benzotriazole, bis-benzotriazole or copper deactivating benzotriazole or tolutriazole derivatives, e.g. their Mannich base derivatives; mercaptobenzotriazole; N-acyl sarcosines; N-acylimino diacetic acids; ethanolamines; fatty amines; and polycarboxylic acids, for example, polymaleic acid and polyacrylic acid, as well as their respective alkali metal salts, copolymers of maleic anhydride, e.g. copolymers of maleic anyhdride and sulfonated styrene, copolymers of acrylic acid, e.g. copolymers of acrylic acid and hydroxyalkylated acrylic acid, and substituted derivatives of polymaleic and polyacrylic acids and their copolymers. Moreover, in such completely aqueous systems, the inhibitor used according to the invention may be used in conjunction with further dispersing and/or threshold agents, e.g. polymerized acrylic acid (or its salts), phosphino-polycarboxylic acids (as described and claimed in British Patent 1458235), the cotelomeric compounds described in European Patent Application No: 150706, hydrolyzed polyacrylonitrile, polymerized methacrylic acid and its salts, polyacrylamide and copolymers thereof from acrylic and methacrylic acids, lignin sulphonic acid and its salts, tannin, napthalene sulphonic acid/formaldehyde condensation products, starch and its derivatives, cellulose, acrylic acid/lower alkyl hydroxyacrylate copolymers, e.g. those described in U.S. Pat. No. 4,029,577, styrene/maleic anhydride copolymers and sulfonated styrene homopolymers, e.g. those describe in U.S. Pat. No. 4,374,733, and combinations thereof. Specific threshold agents, such as for example, 2-phosphono-butane- 1,2,4-tri-carboxylic acid (PBSAM), hydroxyethyl diphosphonic acid (HEDP), hydrolyzed polymaleic anhydride and its salts, alkyl phosphonic acids, hydroxyphosphonoacetic acid, 1-aminoalkyl-1, 1-diphosphonic acids and their salts, and alkali metal polyphosphates, may also be used.

Particularly interesting additive packages are those comprising compounds of formula I with one or more of polymaleic acid or polyacrylic acid or their copolymers, or substituted copolymers, hydroxyphosphonoacetic acid, HEDP, PBSAM, triazoles such as tolutriazole, molybdates and nitrites.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones, e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides, e.g. amines, quaternary ammonium compounds, chloro-phenols, sulphur-containing compounds such as sulphones, methylene bis thiocyanates and carbamates, isothiazolones, brominated propionamides, triazines, phosphonium compounds, chlorine and chlorine-release agents, bromine and bromine release agents, and organometallic compounds such as tributyl tin oxide, may be used.

If the system to be treated by the method of the invention is not completely aqueous, e.g. an aqueous machining fluid formulation, it may be, e.g. a water dilutable cutting or grinding fluid.

The aqueous machining fluid formulations of the invention may be, e.g. metal working formulations. By "metal working", we mean reaming, broaching, drawing, spinning, cutting, grinding, boring, milling, turning, sawing, non-cutting shaping or rolling. Examples of water-dilutable cutting or grinding fluids into which the corrosion inhibiting combination may be incorporated include:

a) aqueous concentrates Of one or more corrosion inhibitors, and optionally one or more anti-wear additives, used as dilutions of 1:50 to 1:100, which are usually employed as grinding fluids;

b) polyglycols containing biocides, corrosion inhibitors and anti-wear additives which are used as dilutions of 1:20 to 1:40 for cutting operations and 1:60 to 1:80 for grinding;

c) semi-synthetic cutting fluids similar to (b) but containing in addition 10 to 25% oil with sufficient emulsifier to render the water diluted product translucent;

d) an emulsifiable mineral oil concentrate containing, for example, emulsifiers, corrosion inhibitors, extreme pressure/anti-wear additives, biocides, antifoaming agents, coupling agents, etc; they are generally diluted from 1:10 to 1:50 with water to a white opaque emulsion;

e) a product similar to (d) containing less oil and more emulsifier which, on dilution to the range 1:50 to 1:100, gives a translucent emulsion for cutting or grinding operations.

For those partly-aqueous systems in which the aqueous system component is an aqueous machining fluid formulation, the inhibitor of formula I used according to the invention may be used singly, or in admixture with other additives, e.g. known further corrosion inhibitors and/or extreme-pressure additives.

Examples of other corrosion inhibitors which may be used in these aqueous systems, in combination with the inhibitor composition used according to the invention, include the following groups:

a) Organic acids, their esters or ammonium, amine, alkanolamine and metal salts, for example, benzoic acid, p-tert-butyl benzoic acid, disodium sebacate, triethanolamine laurate, iso-nonanoic acid, triethanolaminme salt of (p-toluene sulphonamido caproic acid), triethanolamine salt of benzene sulphonamido caproic acid, triethanolamine salts of 5-ketocarboxylic acid derivatives as described in European Patent No. 41927, sodium N-lauroyl sarcosinate or nonyl phenoxy acetic acid;

b) Nitrogen containing materials such as the following types: fatty acid alkanolamides; imidazolines, for example, 1-hydroxy-ethyl-2-oleylimidazolines; oxazolines; triazoles for example, benzotriazoles, or their Mannich base derivatives; triethanolamines; fatty amines; inorganic salts, for example, sodium nitrate; and the carboxy-triazine compounds described in European Patent Application No: 46139;

c) Phosphorus containing materials such as the following types: amine phosphates, phosphonic acids or inorganic salts, for example, sodium dihydrogen phosphate or zinc phosphate;

d) Sulphur containing compounds such as the following types: sodium, calcium or barium petroleum sulphonates, or heterocyclics, for example, sodium mercaptobenzothiazole.

Nitrogen-containing materials, particularly triethanolamine, are preferred.

Examples of extreme pressure additives which may be present in the systems treated according to the present invention include sulphur and/or phosphorus and/or halogen containing materials, for instance, sulphurized sperm oil, sulphurized fats, tritolyl phosphate, chlorinated paraffins or ethoxylated phosphate esters.

When triethanolamine is present in the aqueous systems treated according to the present invention, it is preferably present in an amount such that the ratio of inhibitor composition to triethanolamine is from 2:1 to 1:20.

The partly-aqueous systems treated by the method of the present invention may also be aqueous surface-coating compositions, e.g. emulsion paints and aqueous powder coatings for metallic substrates.

The aqueous surface-coating composition may be, e.g. a paint such as a styrene-acrylic copolymer emulsion paint, a resin, latex, or other aqueous based polymer surface-coating systems, to coat a metal substrate. The inhibitor composition used according to the invention may be employed to prevent flash rusting of the metal substrate during application of the surface coating and to prevent subsequent corrosion during use of the coated metal.

In aqueous surface-coating compositions treated by the method of the invention the inhibitor composition may be used singly, or in admixture with other additives, e.g. known corrosion inhibitors, biocides, emulsifiers and/or pigments.

The further known corrosion inhibitors which may be used are, e.g. those of classes a), b), c) and d) hereinbefore defined.

Examples of biocides which may be used in these aqueous systems, in combination with a compound of formula I, include the following:

Phenols, and alkyl-and halogenated phenols, for example, pentachlorophenol, o-phenylphenol, o-phenoxyphenol and chlorinated o-phenoxyphenol, and salicylanilides, diamines, triazines and organometallic compounds such as organomercury compounds and organotin compounds.

Examples of pigments which may be used in these aqueous systems, in combination with a compound of formula I, include titanium dioxide, zinc chromate, iron oxide and organic pigments such as the phthalocyanines.

As already indicated, the cotelomers of formula I also function as dispersing agents and/or antifoulants towards common deposits, e.g. iron oxides and/or iron salts, calcium and magnesium deposits, e.g. their carbonates, sulphates, oxalates and phosphates, and silt, alumina, silicates and clays found in such waters.

In particular, the method of the present invention may be applied to disperse deposits in an aqueous system containing 5–1500 ppm by weight of calcium ion as well as suspended solids.

This aspect of the present invention finds particular use in the china clay industry in which it is important to obtain slurries which will not appreciably separate out during transportation from the clay pits to the user. At high concentration of suspended solids in these slurries, the cotelomers of formula I disperse china clay and are of value as "in-process" dispersants and as grinding aids.

The following Examples further illustrate the present invention.

EXAMPLE 1

To 44 g of sodium hypophosphite are added slowly 102 g of hydrochloric acid (36%) followed by 43.5 g of acetone. The mixture is heated with mixing to reflux for 7 hours. The product is washed twice with distilled water. 24 g of NaOH are added and the resulting solution evaporated to dryness. 90 g of product (92% yield based on sodium hypophosphite) is obtained. $^{31}$p nmr shows a main peak at 39.3 ppm due to product. % P=13.5%.

EXAMPLE 2

To 4.43 g of the product of Example 1 in 15 mls of water, are added, separately, 1.19 g of sodium persulphate in 10 mls of water, 78.96 g AMPS (58%) and 14.4 g of acrylic acid with 4.43 g of the product of Example 1 in 10 ml of water, dropwise, over 2 hours, with stirring, at reflux temperature of 100° C. The temperature is then maintained at 100° C. for 2 hours to produce 101 g of product of solids content= 56.58%. The product has $M_n$=847 and $M_w$=3634. % P =1.7.

EXAMPLE 3

To 24.35 g of the product of Example 1 in 80 mls of water, are added, separately, 6.55 g of sodium persulphate in 50 mls of water, 78.96 g of AMPS (58%) and 144 g of acrylic acid with 24.35 g of the product of Example 1 in 55 mls of water, dropwise, over 2 hours, with stirring at reflux, 100° C. The temperature is then maintained at 100° C. for 2 hours to produce 415.6 g of product of solids content =53.71%. The product had $M_w$=2351. % P=2.7.

EXAMPLE 4

33.0 g of sodium hypochlorite are added, dropwise, with cooling, over 1 hour to 51 g of the product of Example 2. The sample is heated for 6 hours, at 80° C., to give 74 g of product with $M_n$ 393 and $M_w$ 3846. P=1.35%, solids content=45.8%.

EXAMPLE 5

95.1 g of sodium hypochlorite are added, dropwise, with cooling, over 1 hour, 207 g of the product of Example 3. The sample is heated to 80° C. for 6 hours to give 278 g of product with $M_n$=860 and $M_w$=2640. Solid contents= 45.27%, % P=2.38%.

EXAMPLE 6

Threshold Test for Calcium Carbonate

The following solutions (a), (b) and (c) are prepared.

a) 1.1 grams of calcium chloride dihydrate and 0.75 grams of magnesium chloride hexahydrate are dissolved in distilled water and the solution is made up to 1 liter.

b) 0.18 gram of sodium carbonate and 0.74 gram of sodium bicarbonate are dissolved in distilled water and the solution is made up to 1 liter.

c) The test compound is dissolved in water to give a solution containing 1000 ppm of active ingredient.
  50 mls of solution (a) are placed in a 4 oz glass bottle. To this solution is added that volume of solution (c) required to produce a concentration of test compound of 2 ppm in the final volume (100ml) of test solution (e.g. 0.2 ml of solution (c) produces a concentration of 2 ppm of test compound in the test solution).
  50 mls of solution (b) are added and the solutions are mixed. The test solution is stored in a constant temperature bath at 70° C for 30 minutes. Air is bubbled through the solutions at 0.5 liters/minute per test bottle.
  40 mls of the test solution are withdrawn, filtered, a crystal of Patton and Reeder's Reagent (2-hydroxy-1-(2-hydroxy-4-sulpho-1-naphthylazo)-3 naphthoic acid) is added, followed by two pellets of sodium hydroxide. The resulting solution is titrated with a standard 0.01M solution of ethylene-diamine tetra-acetic acid di-sodium salt.

The results are expressed as % inhibition of precipitation of calcium carbonate relative to a blank titre (i.e. one containing no test compound), calculated as follows:

$$\% \text{ Inhibition} = \left[ \frac{\text{Titre} - \text{blank titre}}{\text{Standard titre} - \text{blank titre}} \right] \times 100$$

The compound of Example 5 provided 99% inhibition at 2 ppm when tested as described against calcium carbonate.

We claim:

1. A phosphonic cotelomer of the formula I:

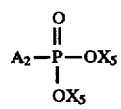

wherein $X_5$ is hydrogen, an alkali metal atom, an alkaline earth metal atom, or an ammonium or amine residue; and $A_2$ is a copolymer residue comprising two different residues

wherein r is an integer ranging from 2 to 100, and wherein, in the first residue, $W_3$ is —COOH, and in the second residue, $W_3$ is —CONHC(CH$_3$)$_2$CH$_2$SO$_3$X$_5$ wherein $X_5$ is as hereinbefore defined.

2. A cotelomer of claim 1 wherein r is 4 to 50.

3. A cotelomer of claim 1 wherein r is 4 to 20.

4. A cotelomer of claim 1 wherein $X_5$ independently is hydrogen or alkali metal.

5. A method for inhibiting scale formation in an aqueous system and/or inhibiting corrosion of metal surfaces in contact with the aqueous system, which comprises adding to the system a scale and/or corrosion inhibiting amount of a cotelomer of claim 4.

6. A cotelomer of claim of claim 1 wherein $X_5$ independently is hydrogen or alkali metal and r is 4 to 50.

7. A method for inhibiting scale formation in an aqueous system and/or corrosion of metal surfaces in contact with the aqueous system, which comprises adding to the system a scale and/or corrosion inhibiting amount of a cotelomer of claim 6.

8. A cotelomer of claim 1 wherein $X_5$ independently is hydrogen or alkali metal and r is 4 to 20.

9. A method for inhibiting scale formation in an aqueous system and/or corrosion of metal surfaces in contact with the aqueous system, which comprises adding to the system a scale and/or corrosion inhibiting amount of a cotelomer of claim 8.

10. A method for inhibiting scale formation in an aqueous system and/or inhibiting corrosion of metal surfaces in contact with the aqueous system, which comprises adding to the system a scale and/or corrosion inhibiting amount of a cotelomer of claim 1.

* * * * *